(12) United States Patent
Arrabotu et al.

(10) Patent No.: US 11,393,192 B2
(45) Date of Patent: Jul. 19, 2022

(54) METHOD AND SYSTEM FOR IDENTIFICATION OF LANDING SITES FOR AERIAL VEHICLES

(71) Applicants: Sheetal Reddy Arrabotu, Karimnagar (IN); Hrishikesh Sagar, New Mumbai (IN); Vinay Sudhakaran, Bangalore (IN); Chandan Yeshwanth, Bangalore (IN)

(72) Inventors: Sheetal Reddy Arrabotu, Karimnagar (IN); Hrishikesh Sagar, New Mumbai (IN); Vinay Sudhakaran, Bangalore (IN); Chandan Yeshwanth, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/997,135

(22) Filed: Aug. 19, 2020

(65) Prior Publication Data
US 2021/0064869 A1 Mar. 4, 2021

(30) Foreign Application Priority Data
Aug. 28, 2019 (IN) .............................. 201931034706

(51) Int. Cl.
*G06V 20/10* (2022.01)
*G08G 5/02* (2006.01)
(Continued)

(52) U.S. Cl.
CPC .......... *G06V 20/176* (2022.01); *G06V 20/182* (2022.01); *G06V 20/64* (2022.01); *G08G 1/0125* (2013.01); *G08G 5/02* (2013.01)

(58) Field of Classification Search
None
See application file for complete search history.

(56) References Cited

U.S. PATENT DOCUMENTS

2014/0214222 A1* 7/2014 Rouse ................... G06Q 10/06
  700/291
2016/0299506 A1* 10/2016 Bruggeman ........... G01C 15/02

OTHER PUBLICATIONS

Dehshibi, Mohammad Mahdi, Mohammad Saeed Fahimi, and Mohsen Mashhadi. "Vision-based site selection for emergency landing of UAVs." Recent Advances in Information and Communication Technology 2015. Springer, Cham, 2015. 133-142. (Year: 2015).*

(Continued)

*Primary Examiner* — David Perlman
(74) *Attorney, Agent, or Firm* — Lempia Summerfield Katz LLC

(57) ABSTRACT

A system and method for identification of a landing site for aerial vehicles are provided. In one embodiment, the method includes processing image data pertaining to a potential site area. The method further includes identifying existing building infrastructure and defining boundaries of the identified existing building infrastructure in the potential site area, based on the processed image data. The method also includes identifying existing road infrastructure adjacent to the boundaries of the identified existing building infrastructure and defining boundaries of the identified existing road infrastructure, based on the processed image data. The method further includes calculating a feasibility score of the existing building infrastructure by analyzing the identified existing building infrastructure and the identified existing road infrastructure. The method further includes outputting the identified existing building infrastructure as a potential landing site for landing aerial vehicles when the calculated feasibility score is above a predetermined threshold score.

18 Claims, 9 Drawing Sheets

(51) Int. Cl.
 *G08G 1/01* (2006.01)
 *G06V 20/64* (2022.01)

(56) References Cited

OTHER PUBLICATIONS

Castagno, Jeremy, Cosme Ochoa, and Ella Atkins. "Comprehensive risk-based planning for small unmanned aircraft system rooftop landing." 2018 International Conference on Unmanned Aircraft Systems (ICUAS). IEEE, 2018. (Year: 2018).*

Patterson, T., McClean, S., Morrow, P., Parr, G., & Luo, C. (2014). Timely autonomous identification of UAV safe landing zones. Image and Vision Computing, 32(9), 568-578. (Year: 2014).*

Fu, Huan, et al. "Deep ordinal regression network for monocular depth estimation." Proceedings of the IEEE Conference on Computer Vision and Pattern Recognition. 2018. pp. 2002-2011.

Godard, Clément, et al. "Digging into self-supervised monocular depth estimation." Proceedings of the IEEE international conference on computer vision. 2019. pp. 1-18.

Joglekar, Apoorva, et al. "Depth estimation using monocular camera." International journal of computer science and information technologies 2.4 (2011): 1758-1763.

Mei, Jilin, et al. "Semantic segmentation of 3d lidar data in dynamic scene using semi-supervised learning." IEEE Transactions on Intelligent Transportation Systems 21.6 (2019): 2496-2509.

Qi, Charles R., et al. "Pointnet: Deep learning on point sets for 3d classification and segmentation." Proceedings of the IEEE conference on computer vision and pattern recognition. 2017. pp. 1-19.

Wang, Yuan, et al. "Pointseg: Real-time semantic segmentation based on 3d lidar point cloud." arXiv preprint arXiv:1807.06288 (2018). pp. 1-7.

Wu, Bichen, et al. "Squeezeseg: Convolutional neural nets with recurrent crf for real-time road-object segmentation from 3d lidar point cloud." 2018 IEEE International Conference on Robotics and Automation (ICRA). IEEE, 2018. pp. 1887-1893.

* cited by examiner

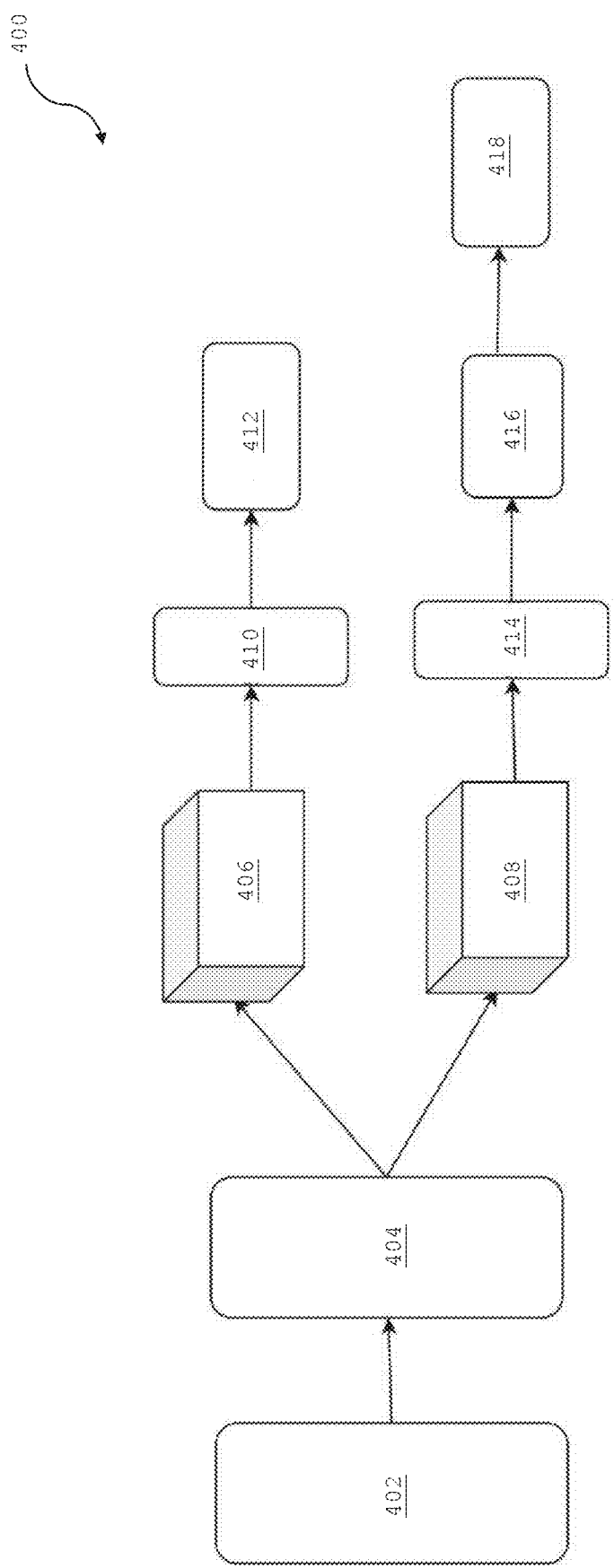

FIG. 4

402 - Input images
404 - Crop images
406 - Road segmentation network
408 - Building segmentation network
410 - Stitch together road infrastructure segmentation maps
412 - Extract interferences about the road infrastructure
414 - Stitch together building infrastructure segmentation maps
416 - Define boundaries of identified building infrastructure
418 - Extract interferences about the building infrastructure 702 - Compute geometry and dimensions
704 - Evaluate available space
706 - Determine suitability of available space
708 - Survey neighborhood
710 - Survey next site
712 - Determine if neighborhood is conducive
714 - Record and process selected site

METHOD AND SYSTEM FOR IDENTIFICATION OF LANDING SITES FOR AERIAL VEHICLES

The present patent document claims the benefit of Indian Patent Application No. 201931034706, filed Aug. 28, 2019, which is hereby incorporated by reference.

TECHNICAL FIELD

The present disclosure generally relates to air mobility infrastructure, and more particularly relates to a system and a method for identification of landing sites for aerial vehicles.

BACKGROUND

Unmanned aerial vehicles (UAVs) include a variety of vehicles, from conventional fixed wing airplanes, to helicopters, to ornithopters (i.e., machines that fly like birds), and are used in a variety of roles. They may be remotely directed by a pilot on the ground or may be autonomous or semi-autonomous vehicles that fly missions using preprogrammed coordinates, GPS navigation, etc. UAVs may be equipped with cameras to provide imagery during flight, which may be used for navigational or other purposes, (e.g., identify a house address, etc.). UAVs may also be equipped with sensors to provide local weather and atmospheric conditions, radiation levels, and other conditions. UAVs may also include cargo bays, hooks, or other devices for carrying payloads. Newer generation UAVs may also provide significant payload capabilities. As a result, UAVs may also be used for delivering packages, groceries, mail, and other items. The use of UAVs for deliveries may reduce costs and increase speed and accuracy. However, the range provided by current UAV technology makes operations over a wide area; e.g., throughout a city, or even a portion of a city difficult to achieve, as the UAV may need to be recharged after completing a few trips or so.

Furthermore, it is widely acknowledged that there has been rapid increase in the number of vehicles on streets globally which has not seen proportional development in infrastructure. This has resulted in traffic congestion, in all major cities, at unprecedented levels. It is widely believed that flying vehicles may replace cars driven on roads, which would help in reducing the traffic congestions. This will also help to save time as trips that took hours on the ground may be reduced to minutes in the air, which in-turn would help to improve productivity and quality of life. With the increasing popularity of small UAVs or drones, and regulations increasingly supporting their commercial use, passenger drones and flying cars appear to be moving closer to reality. Despite the technological progress and many potential applications of the UAVs, there are various challenges to consider with respect to regulations, certifications, infrastructure, and air traffic management. In particular, infrastructure constraints including proper take-off and landing zones within the city, parking facility and battery charging bays poses as a big hurdle in realizing the potential of the industry.

It is a complex endeavor to construct take-off and landing pads for autonomous drones in regions that are already overcrowded. In order to discover potential infrastructure sites, human labor is required to gather and analyze survey data to identify feasible sites, which is time-consuming and expensive. For example, many businesses operating in the industry develop their own, limited take-off and landing infrastructure that is manually verified. Such infrastructure may be built ground up, from laying the foundation for take-off and landing pads, which may turn out to be quite expensive endeavor for the business.

In light of the above, there is a need of a viable solution to automate the identification and verification of a landing site for aerial vehicles which is valid across all geographical regions and is less labor intensive and is economical.

SUMMARY

The scope of the present disclosure is defined solely by the appended claims and is not affected to any degree by the statements within this summary. The present embodiments may obviate one or more of the drawbacks or limitations in the related art.

The object of the present disclosure is achieved by a computer-implemented method for identification of landing sites for aerial vehicles. The method includes processing image data pertaining to a potential site area. The method further includes identifying existing building infrastructure and defining boundaries of the identified existing building infrastructure in the potential site area, based on the processed image data. The method also includes identifying existing road infrastructure adjacent to the boundaries of the identified existing building infrastructure and defining boundaries of the identified existing road infrastructure, based on the processed image data. The method further includes calculating a feasibility score of the existing building infrastructure by analyzing the identified existing building infrastructure and the identified existing road infrastructure. The method further includes outputting the identified existing building infrastructure as a potential landing site if the calculated feasibility score of the identified existing building infrastructure is above a predetermined threshold score.

In an embodiment, the feasibility score of the identified existing building infrastructure is a measure of the identified existing building infrastructure as the landing site to support landing of the aerial vehicles thereon.

In an embodiment, the method includes determining accessibility index of the identified existing road infrastructure based on relative distance between the identified existing building infrastructure and the identified existing road infrastructure. The method further includes determining connectedness index of the identified existing road infrastructure based on distance of the identified existing road infrastructure from one or more of nearby transport stations. Also, the method includes determining quality index of the identified existing road infrastructure based on physical condition of the identified existing road infrastructure. The method further includes determining traffic index of the identified existing road infrastructure based on estimation of average traffic on the identified existing road infrastructure over one or more time periods. The method further includes calculating a connectivity score for the identified existing road infrastructure based on the determined accessibility index, the connectedness index, the quality index, and the traffic index thereof.

In an embodiment, the method further includes determining a height index based on an estimation of height of the identified existing building infrastructure. The method further includes determining obstacle index based on identification of one or more possible obstacles proximal to the identified existing building infrastructure and relative positions thereof with respect to the identified existing building infrastructure for landing the aerial vehicles thereon. The method further includes calculating an absence of obstacles score for the identified existing building infrastructure based on the determined height index and the obstacle index.

In an embodiment, the height of the identified existing building infrastructure is estimated by utilizing one or more of information of camera parameters associated with the image data, altitude information associated with the image data, and depth analysis of the identified existing building infrastructure from the image data.

In an embodiment, the method further includes calculating an electricity availability score for the identified existing building infrastructure based on known uptime of electricity supply to the identified existing building infrastructure.

In an embodiment, the method further includes calculating an ease of flying score for the identified existing building infrastructure based on at least one of identification of no-fly zones and availability of potential emergency landing sites nearby the identified existing building infrastructure.

In an embodiment, the method further includes assigning respective weight coefficients to one or more of the calculated connectivity score, the absence of obstacles score, the electricity availability score, and the ease of flying score.

In an embodiment, the feasibility score is calculated as a cumulative sum of the calculated connectivity score, the absence of obstacles score, the electricity availability score, and the ease of flying score in consideration of the assigned one or more respective weight coefficients.

In an embodiment, the existing building infrastructure is outputted as the potential landing site utilizing real-time image data obtained from the aerial vehicle.

The object of the present disclosure is also achieved by an apparatus for identification of a landing site for aerial vehicles. The apparatus includes at least one memory configured to store computer program code instructions. The apparatus also includes at least one processor configured to execute the computer program code instructions to cause the acts of the method described above.

The object of the present disclosure is further achieved by a system including one or more aerial vehicles, and the apparatus for identification of a landing site for aerial vehicles as described above.

The object of the present disclosure is further achieved by a computer-program product, having machine-readable instructions stored therein, that when executed by a processor, cause the processor to perform acts of the method described above.

Still other aspects, features, and advantages of the disclosure are readily apparent from the following detailed description, simply by illustrating a number of particular embodiments and implementations. The disclosure is also capable of other and different embodiments, and its several details may be modified in various obvious respects, all without departing from the scope of the disclosure. Accordingly, the drawings and description are to be regarded as illustrative in nature, and not as restrictive.

BRIEF DESCRIPTION OF THE DRAWINGS

A more complete appreciation of the present disclosure and many of the attendant aspects thereof will be readily obtained as the same becomes better understood by reference to the following description when considered in connection with the accompanying drawings:

FIG. 4 is a schematic representation of a workflow for road and building analysis, in accordance with an embodiment.

Figure 1:
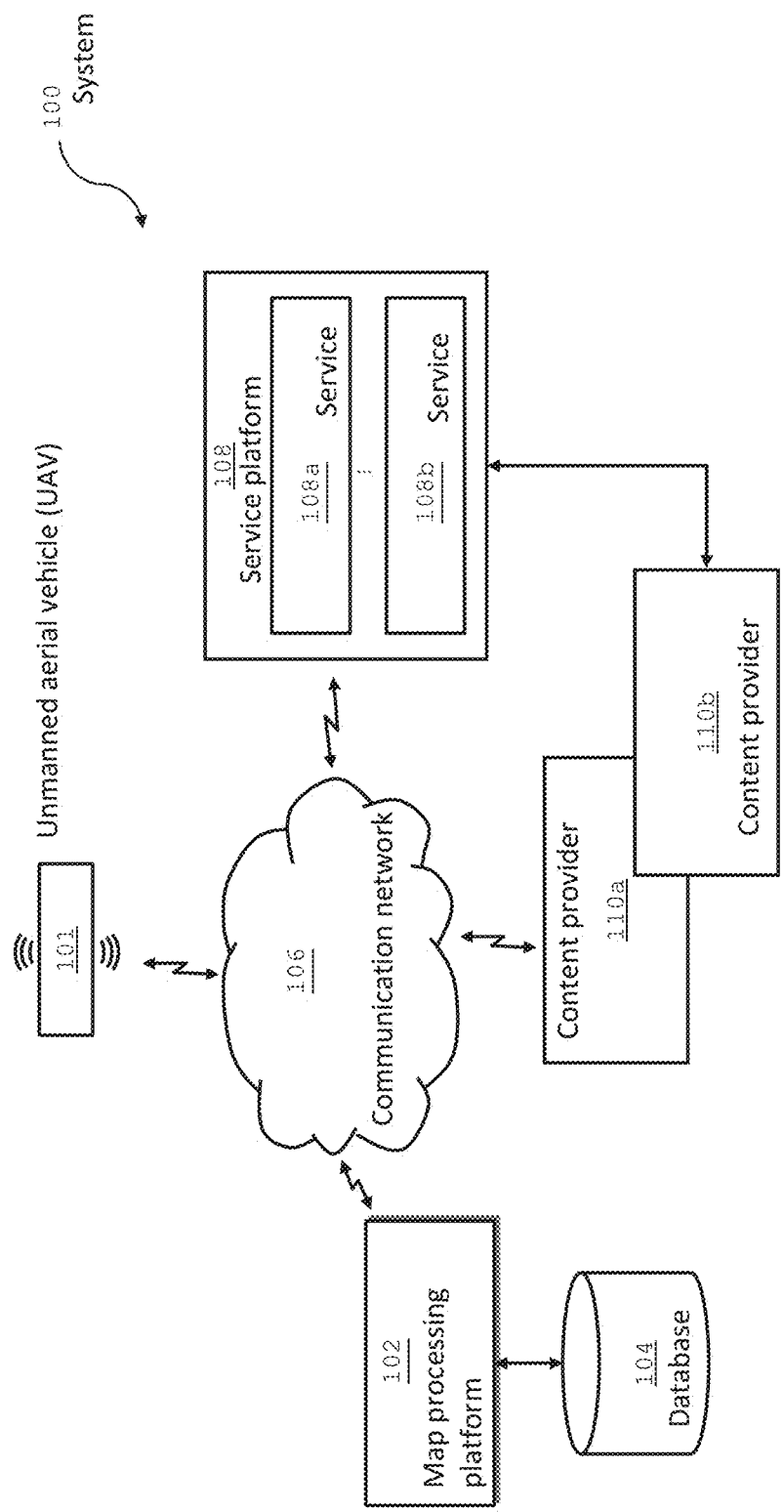
FIG. 1 is a schematic representation of a high-level architecture for a system to be implemented for identification of landing sites for aerial vehicles, in accordance with an embodiment.

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

DETAILED DESCRIPTION

Examples of a method, a system, and a computer-program product for identification of landing sites for aerial vehicle are disclosed herein. In the following description, for the purposes of explanation, numerous specific details are set forth in order to provide a thorough understanding of the embodiments. It is apparent, however, to one skilled in the art that the embodiments may be practiced without these specific details or with an equivalent arrangement. In other instances, well-known structures and devices are shown in block diagram form in order to avoid unnecessarily obscuring the embodiments.

FIG. 1 is a schematic representation of a high-level architecture for a system 100 to be implemented for identification of a landing site for aerial vehicles, in accordance with one or more embodiments of the present disclosure. In the present examples, the system 100 may be implemented for identification of landing sites in the potential site area which may support landing of an Unmanned Aerial Vehicle (UAV) 101. The system 100 of the present disclosure implements computational techniques to process geographic data (e.g., map data) of a potential site area for identification of any possible landing site therein. Herein, the potential site area may be identified randomly from the available geographic data or may be inputted by an operator or may be selected based on some parameters, while processing the geographic data. For this purpose, surveyed sites are evaluated against the requirements and a few of these are shortlisted. The system 100 may, but not necessarily, use machine learning models (e.g., a supervised learning algorithm implementing Random Forest, Decision Tree, Neural Net, or equivalent techniques) to achieve the purpose. In the present examples, the system 100 may be embodied as a cloud-based service.

As illustrated in FIG. 1, the system 100 includes a map processing platform 102. In present embodiments, the map processing platform 102 segments a map of the potential site area represented in a geographic database (e.g., a geographic database 104, as also illustrated in FIG. 1) into segments of a predetermined area. Then, the map processing platform 102 may make infrastructure predictions for each segment of the potential site area. In one embodiment, the map processing platform 102 may be a platform with multiple interconnected components. The map processing platform 102 may include multiple servers, intelligent networking devices, computing devices, components, and corresponding software for providing parametric representations of lane lines. In addition, it is noted that the map processing platform 102 may be a separate entity of the system 100, a part of the one or more services 108a, 108b, or a part of the services platform 108 without any limitations.

Further, as illustrated, the map processing platform 102 has connectivity over a communication network 106 to a services platform 108 (e.g., an OEM platform) that provides one or more services (e.g., services 108a and 108b), such as sensor data collection services. By way of example, the services 108a, 108b may also be other third-party services and include mapping services, navigation services, travel planning services, notification services, social networking services, content (e.g., audio, video, images, etc.) provisioning services, application services, storage services, contextual information determination services, location based services, information based services (e.g., weather, news), etc. In one embodiment, the services platform 108 uses the output (e.g., landing site identification) from the map processing platform 102 to provide services such as navigation, mapping, other location-based services, etc.

In one embodiment, content providers (e.g., content providers 110a, 110b) may provide content or data (e.g., including geographic data, parametric representations of mapped features, etc.) to the geographic database 104, the map processing platform 102, the services platform 108, the services 108a, 108b, and/or the UAV 101. The content provided may be any type of content, such as map content, textual content, audio content, video content, image content, etc. In one embodiment, the content providers 110a, 110b may provide content that may aid in the detecting and classifying landing sites or other related characteristics. In one embodiment, the content providers 110a, 110b may also store content associated with the geographic database 104, the map processing platform 102, the services platform 108, the services 108a, 108b, and/or the UAV 101. In another embodiment, the content providers 110a, 110b may manage access to a central repository of data, and offer a consistent, standard interface to data, such as a repository of the geographic database 104.

Figure 2:
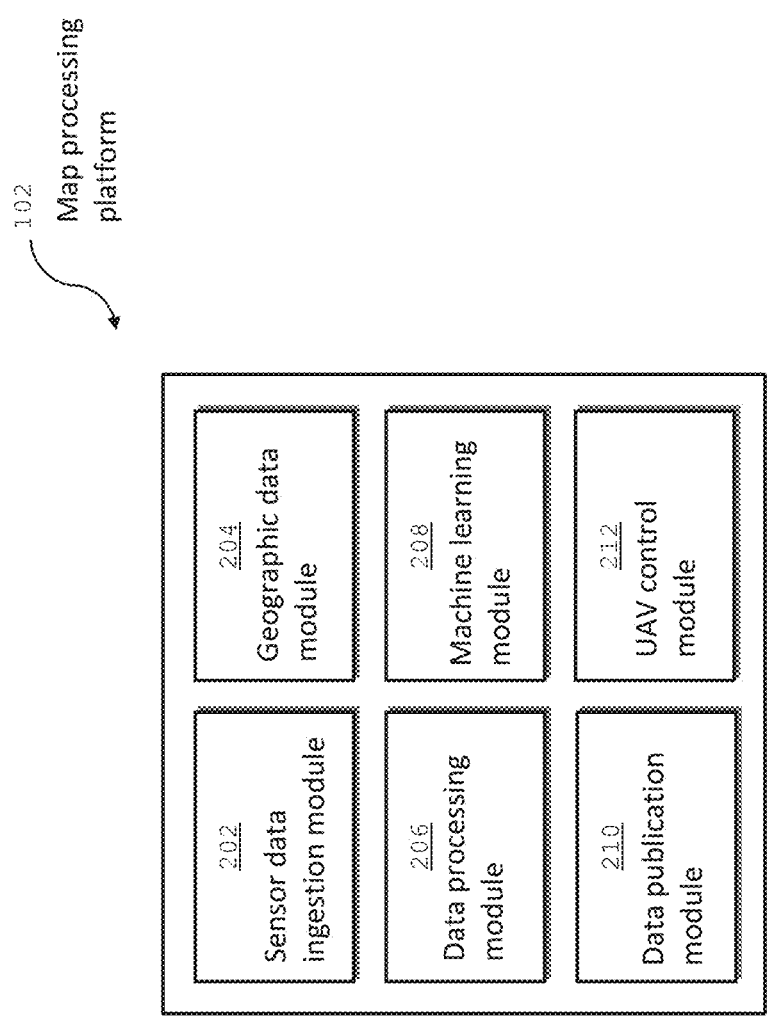
FIG. 2 is a schematic representation illustrating components of a map processing platform as shown in FIG. 1, in accordance with an embodiment.

FIG. 2 is a schematic representation of the components of the map processing platform 102, according to one embodiment. By way of example, the map processing platform 102 includes one or more components for collecting, retrieving, and processing of geographic data, according to the various embodiments described herein. It is contemplated that the functions of these components may be combined or performed by other components of equivalent functionality. In this embodiment, the map processing platform 102 include a sensor data ingestion module 202, a geographic data module 204, a data processing module 206, a machine learning module 208, a data publication module 210, and a UAV control module 212. The above presented modules and components of the map processing platform 102 may be implemented in hardware, firmware, software, or a combination thereof. Though depicted as separate entities in FIG. 1, it is contemplated that the map processing platform 102 may be implemented as a module of any of the components of the system 100. In another embodiment, one or more of the modules 202-212 may be implemented as a cloud-based service, local service, native application, or a combination thereof.

Figure 3:
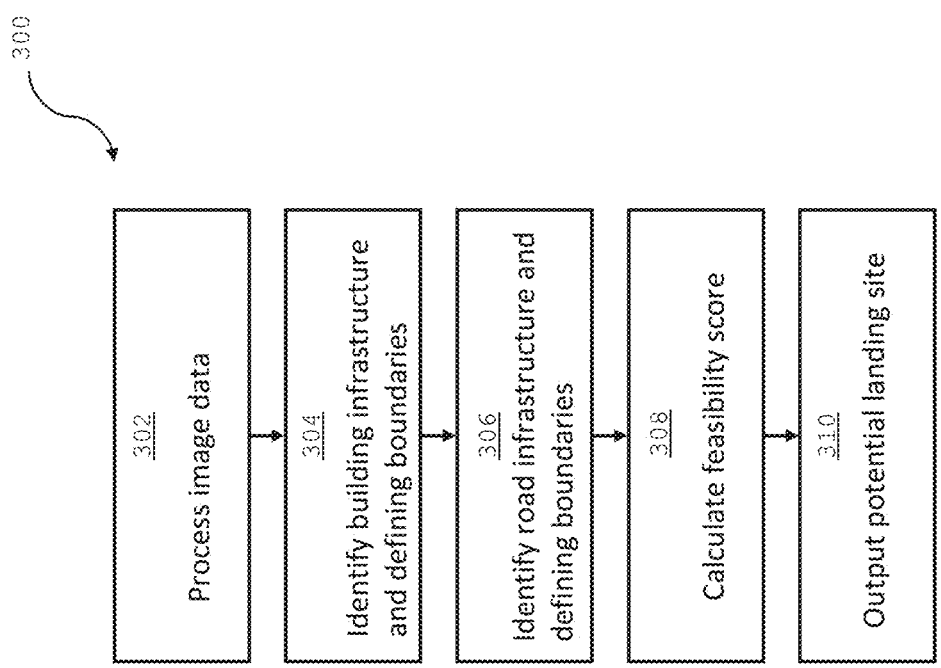
FIG. 3 is a flowchart illustrating a method for identification of landing sites for aerial vehicles, in accordance with an embodiment.

FIG. 3 is a flowchart of a computer-implemented method 300 for identification of landing sites for an aerial vehicle, in accordance with an embodiment. In various embodiments, the map processing platform 102, the services platform 108 and/or any of the modules 202-212 may perform one or more portions of the method 300 and may be implemented in, for instance, a computing system including a processor and a memory as shown in FIG. 12. As such, the map processing platform 102, the services platform 108 and/or any of the modules 202-212 may be provided for accomplishing various parts of the method 300, as well as for accomplishing embodiments of other processes described herein in conjunction with other components of the system 100. Although the method 300 is illustrated and described as a sequence of acts, its contemplated that various embodiments of the method 300 may be performed in any order or a combination and need not include all of the illustrated acts. The method 300, for instance, describes the process of identification of landing sites for an aerial vehicle from the potential site area.

At act 302, image data pertaining to the potential site area is processed. For this purpose, the map processing platform 102 may be configured to retrieve information related to geographic data (including image data) of the potential site area from the geographic database 104. In one example, the sensor data ingestion module 202 may be used to retrieve UAV sensor data, and the geographic data module 204 may be used to retrieve geographic data for the potential site area. The geographic data may include satellite images of the potential site area. The images may be one or more of panchromatic images, multispectral images and RGB images. The images resolution may be as high as 30 centimeters (cm). The satellite images may be obtained from content providers 110a, 110b like Google Maps® or any other third-party source without any limitations. It is known that such satellite images are taken frequently and may be updated, and thus may be used to monitor infrastructure in the potential site area like buildings, roads, tree cover, etc. Further, herein, the UAV sensor data may be data regarding the potential site area, as collected by the UAV 101 travelling over the potential site area. The UAV sensor data may include aerial images taken by the UAV 101. Such aerial images may be one or more of RGB images (e.g., monocular images), depth images (e.g., from stereo camera or LIDAR), or the like. It may be appreciated that the UAV 101 may be fitted with the required sensors and cameras for the purpose. In one example, if the stereo camera and LIDAR may not be available with the UAV 101, the depth information about the potential site area may also be obtained from RGB images using monocular depth estimation techniques. These techniques are well known in the art. Some examples of such techniques are presented in research papers, for instance, "Digging into self-supervised monocular depth estimation" (Goddard et al.), "Deep ordinal regression network for monocular depth estimation" (H Fu et al.), and "Depth Estimation Using Monocular Camera" (Joglekar et al.). It may be appreciated that the UAV sensor data (including aerial images) may be taken more frequently to provide more up-to-date information. For example, a survey drone may be deployed for a few hours (depending on its battery capacity) to get real time data on human and vehicle movement at the potential site area. For this purpose, the UAV control module 212 may send command to the UAV 101 to capture the required images. It may be contemplated that such commands may be sent autonomously or may be sent by an operator or a pilot of the UAV, as required. Herein, as discussed, at first the satellite images are analyzed for initial feasibility, and then the aerial images from the UAV 101 are utilized for a detailed check.

The method 300 further includes a planning phase for recognition and validation of the landing site in the potential site area. The planning phase may include: (1) building and road analysis, (2) road analysis, (3) site candidate shortlisting, and (4) autonomous on-site survey. These processes may be carried out in order or concurrently to achieve the purpose. The details about the listed processes are provided in the subsequent paragraphs in context of the method of the present disclosure.

At act 304, existing building infrastructure and defining boundaries of the identified existing building infrastructure in the potential site area is identified, based on the processed image data. In the present system 100, the data processing module 206 may process the collected image data to identify potential building infrastructure (e.g., rooftops of the buildings) which may be suitable as a landing site. In particular, the data processing module 206 may utilize the collected images to identify the location and geometry of the building, dimensions of roof-tops, the planarity of the rooftops (e.g., whether a rooftop is flat or slanted) and height of the buildings.

Further, at act 306, existing road infrastructure and defining boundaries of the identified existing road infrastructure is identified, based on the processed image data. The road infrastructure is identified adjacent to the boundaries of the identified existing building infrastructure. The road infrastructure may include any one or more of public roads leading to the building from one or more nearby transportation stations, private roads providing accessed to the entry of the building, and the like.

Herein, the data processing module 206 may process the collected image data using image segmentation techniques (to obtain segmentation map) as known in the art. This segmentation map is obtained using deep convolutional neural networks (DCNNs), such as, for example, but not limited to, D-Linknet. To reduce computational complexity and preserve the spatial resolution of the input image, the input image is divided into a grid of smaller non-overlapping images. A segmentation map is obtained for each of these grid images. These maps are then stitched together to obtain the segmentation map of the original input image. In addition, the data processing module 206 may further make use of depth information or point clouds for segmentation. Examples of techniques implemented for the purpose may be found in the art, for instance, "PointSeg: Real-Time Semantic Segmentation Based on 3D LiDAR Point Cloud" (Y Wang et al.), "Semantic Segmentation of 3D LiDAR Data in Dynamic Scene Using Semi-supervised Learning" (J Mei et al.), "PointNet" (CR Qi et al.), "SqueezeSeg" (B Wu et al.), and the like.

Thereafter, the boundaries of the buildings may be defined using one of mask-based image segmentation technique and polygon-based instance segmentation technique. In the mask-based image segmentation technique, every pixel in the image is labelled as either building or background. Such technique may be implemented on Mask RCNN (Region-based convolutional neural networks) as known in the art. In the polygon-based instance segmentation technique, directly outputs the boundaries of individual buildings. Such technique may be implemented on PolyRNN (Polygon Recurrent Neural Network) as known in the art. The road analysis problem is formulated as binary semantic segmentation. It may be understood that semantic segmentation of building and road images is implemented using a standard encoder and decoder CNN architecture. Herein, the input is an RGB image and output is a segmentation map, which is an image of the same size. Further, herein, each pixel is assigned one of two labels, (e.g., either building or background). The details for implementation of such techniques have been described further in the subsequent paragraphs.

The method 300 further includes neighborhood analysis in relation to the identified existing building infrastructure and existing road infrastructure. The neighborhood analysis is required to determine feasibility of the exiting building infrastructure to facilitate landing of an aerial vehicle, (e.g., a UAV), thereon. This provides information about the neighborhood of identified buildings. For this purpose, both satellite images as well as aerial images and videos are utilized. The neighborhood analysis includes, but may not be limited to, last mile connectivity analysis, building height analysis, electricity availability analysis, and ease of flying analysis. It will be appreciated that the terms used should be given a reasonable interpretation in the context of the present disclosure.

Herein, the last mile connectivity analysis involves determining accessibility index of the identified existing road infrastructure based on relative distance between the identified existing building infrastructure and the identified existing road infrastructure. This is achieved using the road segmentation map (as obtained), the building locations, and other information about the camera parameters. It may be appreciated that the accessibility index may be inversely proportional to distance between the identified existing building infrastructure and the identified existing road infrastructure. Further, this involves determining connectedness index of the identified existing road infrastructure based on distance of the identified existing road infrastructure from one or more of nearby transport stations (as inferred earlier). The information about public transport information such as nearby bus, tram, and train connectivity may be obtained using third party sources of information such as Google Maps without any limitations. Again, it may be appreciated that the connectedness index may be inversely proportional to distance of the identified existing road infrastructure from one or more of nearby transport stations. Further, this involves determining quality index of the identified existing road infrastructure based on physical condition of the identified existing road infrastructure. For this purpose, the road is classified based on its type, (e.g., dirt, cement, or asphalt), which is a measure of the road quality. Such techniques are known in the art and thus have not been described herein for the brevity of the present disclosure. Further, this involves determining traffic index of the identified existing road infrastructure based on estimation of average traffic on the identified existing road infrastructure over one or more time periods. For instance, the average traffic metrics of the road is estimated by detecting vehicles on the road using algorithms such as You Only Look Twice (YOLT) or the like. Using the zone on the road closest to a potential landing site, the number of public transport vehicles passing through this zone is counted. Further, a connectivity score for the identified existing road infrastructure is calculated based on the determined accessibility index, the connectedness index, the quality index, and the traffic index thereof. It may be contemplated that the connectivity score may be a sum (or weighted sum) of the determined indexes herein.

Further, the building height analysis involves determining a height index based on an estimation of height of the identified existing building infrastructure (as inferred earlier). It may be contemplated that height of a building may be estimated from aerial images that are not perfectly overhead but taken at an angle to the building. Herein, knowledge of the camera parameters is utilized to calculate the height of the building. Building height may also be obtained as a function of the height from point cloud/depth image, altimeter reading from the UAV 101, and the like. This further involves determining obstacle index based on identification of one or more possible obstacles proximal to the identified existing building infrastructure and relative positions thereof with respect to the identified existing building infrastructure for landing the aerial vehicles thereon. The obstacles (e.g., poles, towers, trees, etc.) may be found using an object detection algorithm as known in the art. In some examples, a survey may be carried out by the UAV 101 which is equipped with LIDAR and three-dimensional scanners to obtain a 3D map of the region around the landing site, which in turn may be reviewed by an operator to identify obstacles. It may be appreciated that depth/point clouds are particularly useful here to obtain an exact 3D map of the region around the landing zone, which is required when the aerial vehicle cannot make a perfectly vertical takeoff/landing. This allows to have smaller landing zones in a complex environment. It may be appreciated that the obstacle index may be inversely proportional to number and/or size of possible obstacles identified. Further, an absence of obstacles score is calculated for the identified existing building infrastructure based on the determined height index and the obstacle index. It may be contemplated that the absence of obstacles score may be a sum (or weighted sum) of the determined indexes, (e.g., the height index and the obstacle index).

Further, the electricity availability analysis involves calculating an electricity availability score for the identified existing building infrastructure based on known uptime of electricity supply to the identified existing building infrastructure. For this purpose, connection to the electric grid and nearby electric towers are identified by detecting power transmission towers and lines from satellite images leading to the identified existing building infrastructure. Herein, the electricity availability score for the identified existing building infrastructure is directly proportional to the known uptime of electricity supply at the identified existing building infrastructure. It may be understood that reliable electrical supply is needed for providing changing infrastructure to the aerial vehicles using the landing site.

Further, the ease of flying analysis involves calculating an ease of flying score for the identified existing building infrastructure based on at least one of identification of no-fly zones and availability of potential emergency landing sites nearby the identified existing building infrastructure. Identification of no-fly zones, and airspace restrictions is carried out based on documents and charts issued by the regulatory body and third parties such as AirMap. Further, nearby airports and military bases are identified with object detection algorithm trained on a dataset such as xView. Further, emergency landing spots (like water bodies and flat land near potential landing sites) which may be used for emergency landings are identified.

At act 308, a feasibility score of the existing building infrastructure is calculated by analyzing the identified existing building infrastructure and the identified existing road infrastructure. Herein, the feasibility score is based on calculated connectivity score, the absence of obstacles score, the electricity availability score, and the ease of flying score (as described in the preceding paragraphs). In the present embodiments, the feasibility score of the identified existing building infrastructure is a measure of the identified existing building infrastructure as the landing site to support landing of the aerial vehicles thereon. For this purpose, respective weight coefficients are assigned to one or more of the calculated connectivity score, the absence of obstacles score, the electricity availability score, and the ease of flying score. It may be appreciated that the weights may be assigned based on various parameters and practical factors. For instance, weights may be assigned according to the specific requirements of a potential site. This accounts for the specific requirements of the aerial vehicles such as physical size, payload and takeoff and landing masses. Further, the feasibility score is calculated as a cumulative sum of the calculated connectivity score, the absence of obstacles score, the electricity availability score, and the ease of flying score in consideration of the assigned one or more respective weight coefficients. For example, the feasibility score is calculated as:

connectivity score, $s_c = f_c(d_p, d_r, f_p), w_c$ wherein, $d_p$ is distance to nearest public transport stop, $d_r$ is distance to nearest major road, $f_p$=frequency of public transport, and $w_c$ is weight assigned thereto;

absence of obstacles score, $s_o = f_o(p_o, c_o), w_o$ wherein, $p_o$ is position of obstacle with respect to the landing zone, $c_o$ represents number/size of the predicted obstacles and $w_o$ is the weight assigned thereto;

electricity availability score, $s_e = f_e(u_e), w_e$ wherein, $u_e$ is uptime of electricity in this area (obtained from power company) and $w_e$ is the weight assigned thereto; and ease of flying score, $s_r$ is manually evaluated with weight assigned ($w_o$), such that feasibility score, $s = \Sigma = c, e, o, r w_i s_i$ At act 310, the identified existing building infrastructure as a potential landing site is outputted if the calculated feasibility score of the identified existing building infrastructure is above a predetermined threshold score. That is, if the threshold score for this neighborhood is T; then the landing site is shortlisted if s>T. Herein, threshold score is calibrated based on well-known landing sites as well as human knowledge. All potential sites that have a score above the threshold score are then outputted.

In some examples, the method 300 includes an autonomous on-site survey. For this purpose, an autonomous drone is deployed to survey the shortlisted site. This survey collects fine-grained and high-resolution images of that site from a lower altitude. This survey data is evaluated with algorithms as well as manually.

FIG. 4 is a schematic representation of a workflow 400 for road and building analysis. At block 402, the images are inputted into the data processing module 206. It may be appreciated that the input images are same for both the road analysis components and the building analysis components. As discussed earlier, the input images include satellite images as well as aerial images (from the UAV 101). At block 404, the input images are cropped. That is, smaller cropped images are created from high resolution input images. Further, the cropped images are provided to road segmentation network (represented as block 406) and building segmentation network (represented as block 408). The road segmentation network 406 then provide segmentation maps related to the road infrastructure for each of the cropped images fed thereto. At block 410, the segmentation maps related to the road infrastructure are stitched together. Further, at block 412, the stitched segmentation map related to the road infrastructure is processed to extract inferences about the road infrastructure, particularly identification of existing road infrastructure adjacent to the boundaries of the identified existing building infrastructure and define boundaries of the identified existing road infrastructure using the techniques described above. Also, in one or more embodiments, the extracted inferences about the road infrastructure include relative distance between the identified existing building infrastructure and the identified existing road infrastructure, distance of the identified existing road infrastructure from one or more of nearby transport stations, physical condition of the identified existing road infrastructure, estimation of average traffic on the identified existing road infrastructure over one or more time periods, and the like. Further, at block 414, the segmentation maps related to the building infrastructure are stitched together. Further, at block 416, the stitched segmentation map undergoes post-processing to define boundaries of the identified existing building infrastructure in the potential site area. At block 418, inferences about the building infrastructure are extracted, like an estimation of height of the identified existing building infrastructure, identification of one or more possible obstacles proximal to the identified existing building infrastructure and relative positions thereof with respect to the identified existing building infrastructure for landing the aerial vehicles thereon, and the like. In the present embodiments, the height of the identified existing building infrastructure is estimated by utilizing one or more of information of camera parameters associated with the image data, altitude information associated with the image data, and depth analysis of the identified existing building infrastructure from the image data. The required additional information, like the altitude information, may be obtained from the sensor data ingestion module 202, as may be contemplated by a person skilled in the art.

Figure 5C:
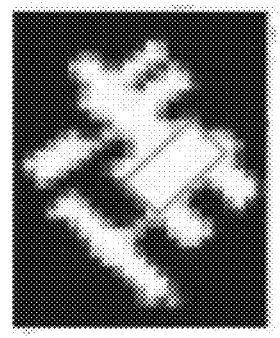
FIGS. 5A-5C are screenshots depicting output at various stages during processing of input images and/or segmentation maps for an exemplary input image, in accordance with an embodiment.
Figure 5B:
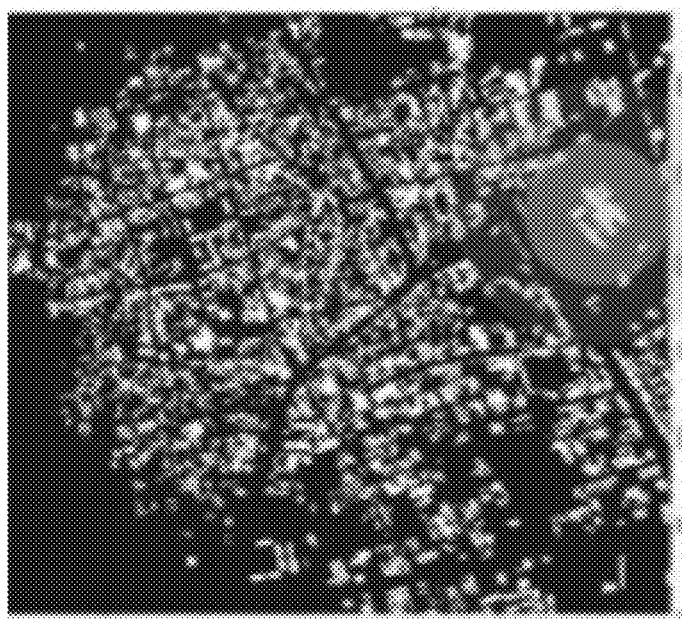
Figure 5A:
Figure 6:
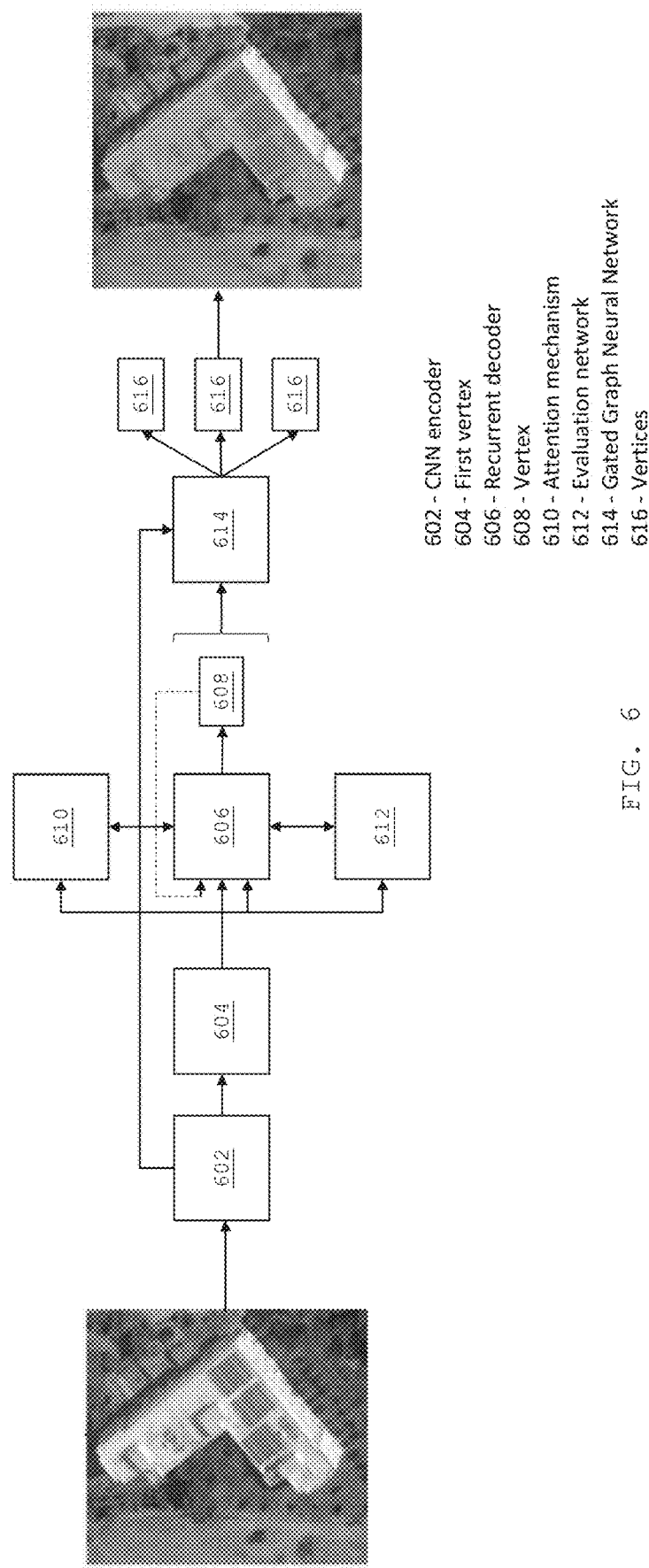
FIG. 6 is a schematic diagram depicting implementation of polygon regression technique to define rooftop of a building, in accordance with an embodiment.

FIGS. 5A-5C depict outputs at various stages during processing of input images and/or segmentation maps for an exemplary input image, in accordance with an embodiment. As may be seen from FIGS. 5A and 5B, the segmentation map of the potential site area is processed to discern various existing building infrastructure and road infrastructure therein. Further, FIG. 5C provides an identified building infrastructure from processing of the segmentation maps. FIG. 6 is a schematic diagram depicting implementation of polygon regression technique utilizing Polygon RNN (or CNN networks), in accordance with an embodiment. Herein, the implemented polygon regression technique takes the aerial image as input and directly outputs a set of points that form the vertices of a polygon to output the location and dimensions of rooftop of a building. Polygon regression is an approach for semi-automatic annotation of object instances. As illustrated in FIG. 6, an image of the building infrastructure is inputted (as may be obtained from the processes of FIGS. 5A-5C). The polygon regression technique utilizes a convolutional neural networks (CNN) encoder 602 to extract image features and thereby provide first vertex (as represented by block 604). Herein, the CNN encoder 602 add two layers, each of dimension D×D, in which one branch predicts object boundaries and other takes as input the output of the boundary-predicting layer as well as the image features and predicts the vertices of the polygon. In some examples, the polygon vertices are decoded using RNN (Circular Neural Network) in order to improve the prediction of CNN encoder 602. The first vertex 604 is inputted to a recurrent decoder 606 to provide a vertex (as represented by block 608) thereby, which is again fed thereto. Herein, the attention mechanism (as represented by block 610) is added in association with the recurrent decoder 606. Further, an evaluation network 612 is added for polygon evaluation in association with the recurrent decoder 606 to select the best candidate from the RNN proposed polygons. Further, Gated Graph Neural Network (GGNN) 614 is implemented for up-sampling to improve output resolution. Thereby, vertices (as represented by blocks 616) of the polygon are obtained which may be utilized to define boundaries of the building infrastructure (as shown).

Figure 7:
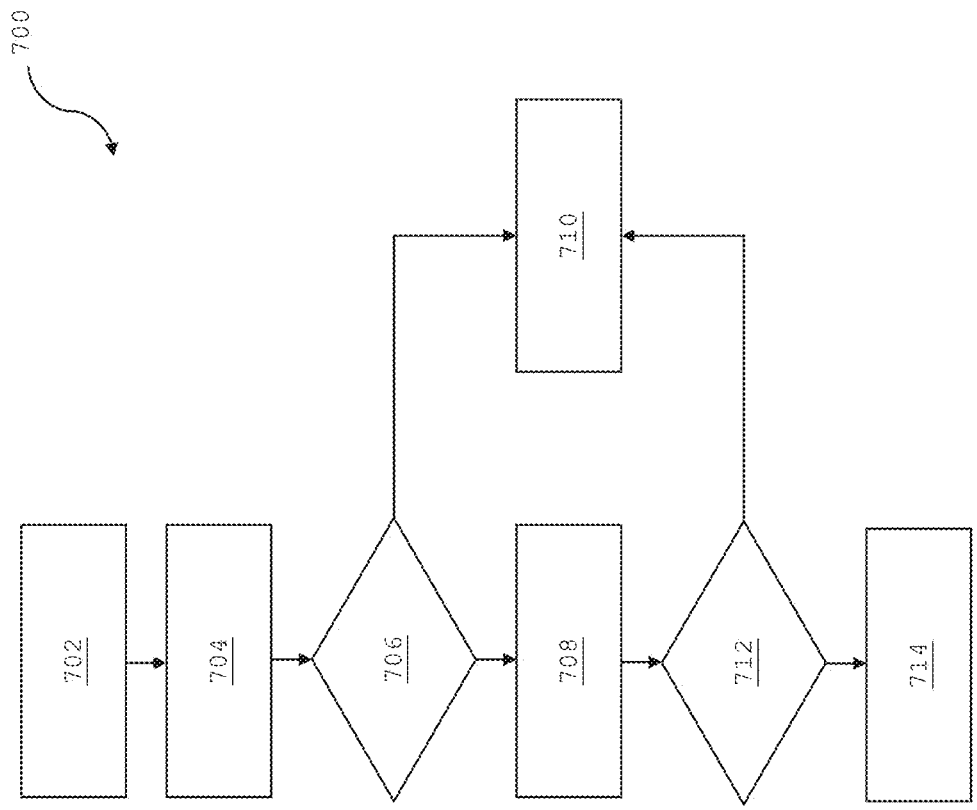
FIG. 7 is a process flowchart providing acts involved in identification of landing sites for aerial vehicles, in accordance with an embodiment.

FIG. 7 is a process flowchart 700 providing acts involved in site identification, in accordance with an embodiment. At act 702, geometry and dimensions of available roof space (as may be obtained from FIG. 5C) is computed. Then, at act 704, the available space is evaluated against the requirements of the aerial vehicles that are expected to be landed thereon. At act 706, it is determined of the available space is suitable for landing of the aerial vehicles. If, at act 706, it is determined that the available space is suitable for landing of the aerial vehicles, then the neighborhood is surveyed as described above in act 708. If, at act 706, it is determined that the available space is not suitable for landing of the aerial vehicles, the next site is surveyed in act 710. At act 712, it is determined whether the surveyed neighborhood is conducive in terms of last mile connectivity, building height, electricity availability and ease of flying, as discussed above. If YES, determined at act 712, the selected site is recorded and processed for detailed evaluation at act 714 using autonomous drones.

According to an embodiment of the present disclosure, the method 300 also includes an operational phase providing real-time landing decision support. Herein, the data including the satellite images and aerial images (as collected from third-party sources or the like, as discussed above) may be used not just to identify the landing sites during the planning phase, but also during operation of aerial vehicle. That is, the existing building infrastructure is outputted as the potential landing site utilizing real-time image data obtained from the aerial vehicle.

For this purpose, the extracted segmentation maps, data about building height, obstacle information are stored on the aerial vehicle or made available over the network. This extracted information is geo-tagged (e.g., the extracted information is associated with geographical coordinates) in the planning phase and is available to the operator or the autonomous controller of the aerial vehicle. Such data may be utilized real-time for example, like in poor weather conditions the pilot of the aerial vehicle may make use of the existing 3D map for navigation around obstacles even if the aerial vehicle is not equipped with a depth sensor or the like. Further, such information may be utilized to identify near-by suitable landing sites in emergency situations. This data may also be used by the present systems to identify which landing site is suitable for an inbound drone. This may be done in real-time because all the infrastructural information is already available.

For the purposes of the present disclosure, the UAV 101 may be equipped with an imaging device, such as, one or more of a camera sensor, a LiDAR sensor (and/or RADAR sensor), a position sensor, a motion sensor, and the like. Further, the sensors may include a communication device to retrieve sensor data directly from other UAVs or air traffic infrastructure with connected communications capabilities (e.g., cellular or other wireless communications equipped vehicles) or from an Original Equipment Manufacturer (OEM) provider (e.g., UAV manufacturer) operating an OEM platform (e.g., a services platform 108a, 108b) that collects sensor data from UAVs manufactured by or otherwise associated with the OEM. The retrieval of the sensor data and/or the geographic data may occur in real-time or near real-time, continuously, periodically, according to a schedule, on demand, etc. In some examples, the sensor data ingestion module 202, for instance, may fuse data from these multiple different sensors to increase consistency thereof, like for detection of obstacles. In some embodiments, the sensor data ingestion module 202 may also pre-process the collected raw sensor data for training of the machine learning model via the machine learning module 208 for better prediction thereby. In the present embodiments, if the site is found to be suitable for landing, details of this site are added to a database, via the data publication module 210.

In an embodiment where the geographic data is used alone or in combination with the sensor data, the geographic data module 204 may retrieve requested geographic data for an area of interest by performing a location-based query of the geographic database 104 or equivalent. By way of example, the geographic data may include any attribute of the corresponding map location stored in the geographic database 104. The retrieved geographic data may include, but is not limited to, a functional class, information about infrastructure density, presence of obstacles, distance to a nearby transport stations, or a combination thereof.

In one embodiment, the communication network 106 of the present system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the map processing platform 102, services platform 108, services 108a, 108b, and/or content providers 110a, 110b communicate with each other and other components of the system 100 using well known, new or still developing protocols. In this context, a protocol includes a set of rules defining how the network nodes within the communication network 106 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes may be effected by exchanging discrete packets of data. Each packet may include (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. The data in the payload for the particular protocol may include a header and payload for a different protocol associated with a different, higher layer of the OSI Reference Model. The header for a particular protocol may indicate a type for the next protocol contained in its payload. The higher layer protocol is said to be encapsulated in the lower layer protocol. The headers included in a packet traversing multiple heterogeneous networks, such as the Internet, may include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
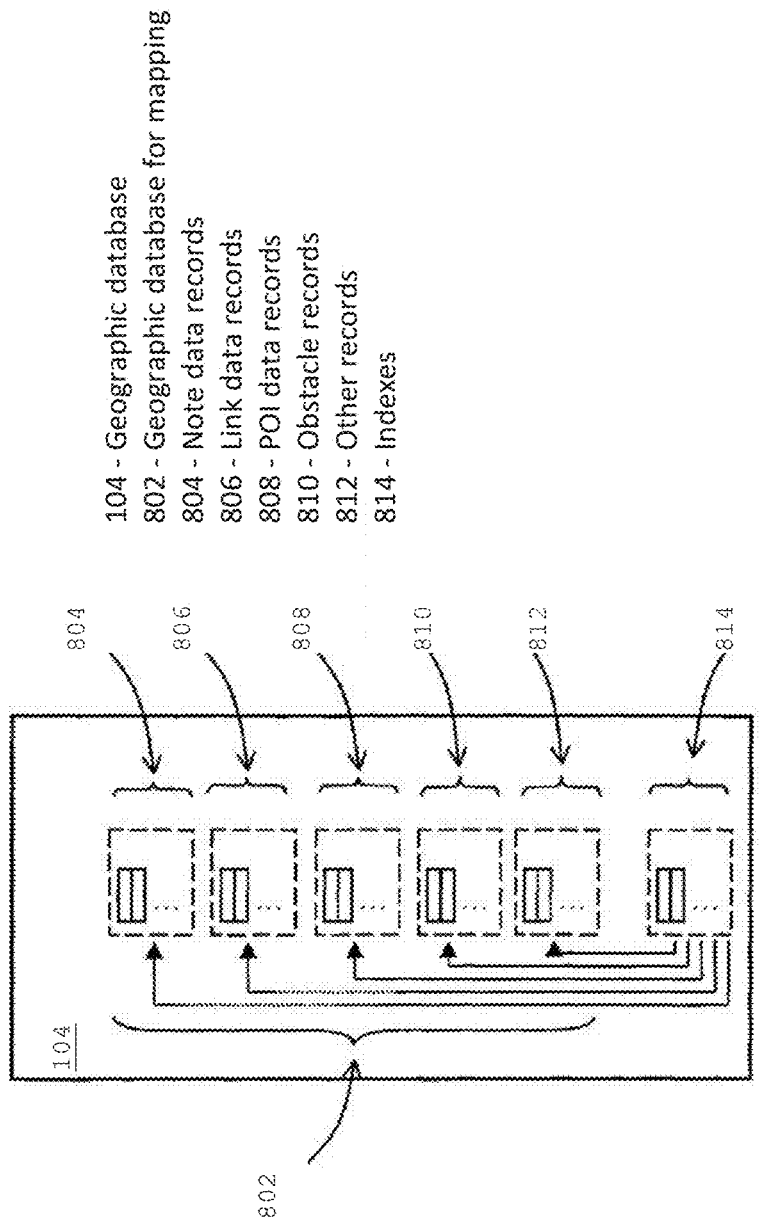
FIG. 8 is a schematic diagram of a geographic database, in accordance with an embodiment.

FIG. 8 is a schematic diagram of a geographic database 104, according to one embodiment. In one embodiment, the geographic database 104 includes geographic data 802 used for (or configured to be compiled to be used for) mapping and/or navigation-related services. In one embodiment, geographic features (e.g., two-dimensional features or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon may be used to represent a footprint of the building, and a three-dimensional polygon extrusion may be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein may be used interchangeably.

In one embodiment, the terminology applied to the representation of geographic features in the geographic database 104 may include "Node" which refers to a point that terminates a link. "Line segment" refers to a straight line connecting two points. "Link" (or "edge") refers to a contiguous, non-branching string of one or more line segments terminating in a node at each end. "Shape point" refers to a point along a link between two nodes (e.g., used to alter a shape of the link without defining new nodes). "Oriented link" refers to a link that has a starting node (referred to as the "reference node") and an ending node (referred to as the "non-reference node"). "Simple polygon" refers to an interior area of an outer boundary formed by a string of oriented links that begins and ends in one node. "Polygon" refers to an area bounded by an outer boundary and none or at least one interior boundary (e.g., a hole or island). In one embodiment, a polygon is constructed from one outer simple polygon and none or at least one inner simple polygon. A polygon is simple if it just includes one simple polygon, or complex if it has at least one inner simple polygon.

In one embodiment, the geographic database 104 follows certain conventions. For example, links do not cross themselves and do not cross each other except at a node. Also, there are no duplicated shape points, nodes, or links. Two links that connect each other have a common node. In the geographic database 104, overlapping geographic features are represented by overlapping polygons. When polygons overlap, the boundary of one polygon crosses the boundary of the other polygon. In the geographic database 104, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 104 includes node data records 804, link data records 806, POI data records 808, obstacle records 810, other records 812, and indexes 814, for example. More, fewer, or different data records may be provided. In one embodiment, additional data records (not shown) may include cartographic ("carto") data records, routing data, and maneuver data. In one embodiment, the indexes 814 may improve the speed of data retrieval operations in the geographic database 104. In one embodiment, the indexes 814 may be used to quickly locate data without having to search every row in the geographic database 104 every time it is accessed. For example, in one embodiment, the indexes 814 may be a spatial index of the polygon points associated with stored feature polygons. The obstacle records 810 store predicted/validated obstacles and other related road characteristics. The predicted data, for instance, may be stored as attributes or data records of an obstacle overlay, which fuses with the predicted attributes with map attributes or features.

In exemplary embodiments, the link data records 806 are links or segments representing paths, as may be used in the calculated route or recorded route information for determination of one or more personalized routes. The node data records 804 are end points corresponding to the respective links or segments of the road segment data records 806. The link data records 806 and the node data records 804 represent a road network, such as used by vehicles, cars, and/or other entities. Alternatively, the geographic database 104 may contain path segment and node data records or other data that represent pedestrian paths or areas in addition to or instead of the vehicle road record data, for example.

In one embodiment, the geographic database 104 may be maintained by the content provider 110a, 110b in association with the services platform 108 (e.g., a map developer). The map developer may collect geographic data to generate and enhance the geographic database 104. There may be different ways used by the map developer to collect data. These ways may include remote sensing, (e.g., aerial or satellite photography), obtaining data from other sources, (e.g., municipalities or respective geographic authorities), and the like.

The geographic database 104 may be a master geographic database stored in a format that facilitates updating, maintenance, and development. For example, the master geographic database or data in the master geographic database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 103, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

It is to be understood that the system and methods described herein may be implemented in various forms of hardware, software, firmware, special purpose processors, or a combination thereof. One or more of the present embodiments may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and digital versatile disc (DVD). Both processors and program code for implementing each aspect of the technology may be centralized or distributed (or a combination thereof) as known to those skilled in the art.

Figure 9:
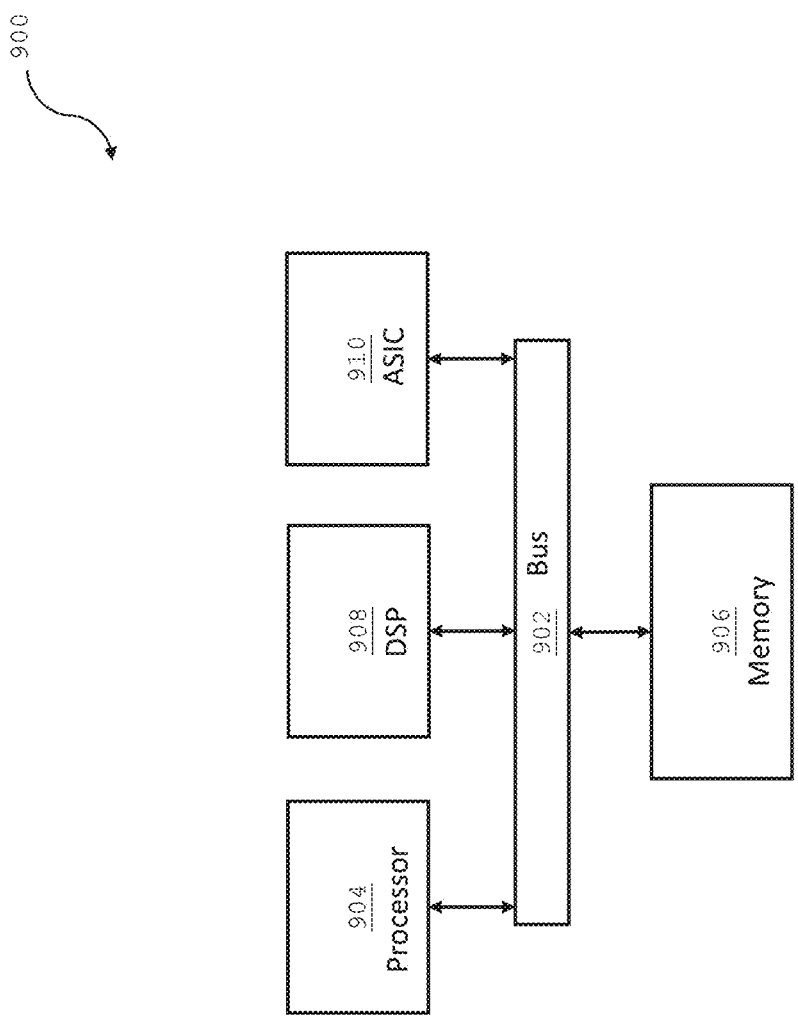
FIG. 9 is a schematic diagram of a computing system that may be implemented for identification of a landing site for aerial vehicles, in accordance with an embodiment.

FIG. 9 illustrates schematic diagram of an apparatus 900 programmed for identification of a landing site for aerial vehicles as described herein, in accordance with an embodiment. Hereinafter, the "apparatus 900" has been referred to as "computing system 900" upon which an embodiment may be implemented. The computing system 900 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the computing system may be implemented in a single chip. The system 100 of the present disclosure as discussed in the preceding paragraphs may include or be embodied in the computing system 900, and further including one or more aerial vehicles (such as, the UAV 101). It may be appreciated that the two systems 100 and 900 (and the corresponding components/elements) may be equivalent for the purposes of the present disclosure.

In one embodiment, the computing system 900 includes a communication mechanism such as a bus 902 for passing information among the components of the computing system 900. The computing system 900 includes one or more processing units 904 and a memory unit 906. The memory unit 906 may be communicatively coupled to the one or more processing units 904. Hereinafter, the one or more processing units 904 are simply referred to as processor 904 and the memory unit 906 is simply referred to as memory 906. Herein, in particular, the processor 904 has connectivity to the bus 902 to execute instructions and process information stored in the memory 906. The processor 904 may include one or more processing cores with each core configured to perform independently. A multi-core processor enables multiprocessing within a single physical package. Examples of a multi-core processor include two, four, eight, or greater numbers of processing cores. Alternatively, or in addition, the processor 904 may include one or more microprocessors configured in tandem via the bus 902 to enable independent execution of instructions, pipelining, and multithreading. The processor 904 may also be accompanied with one or more specialized components to perform certain processing functions and tasks such as one or more digital signal processors (DSP) 908, or one or more application-specific integrated circuits (ASIC) 910. A DSP 908 may be configured to process real-world signals (e.g., sound) in real time independently of the processor 904. Similarly, an ASIC 910 may be configured to performed specialized functions not easily performed by a general purposed processor. Other specialized components to aid in performing the functions described herein include one or more field programmable gate arrays (FPGA) (not shown), one or more controllers (not shown), or one or more other special-purpose computer chips.

As used herein, the term "processor" refers to a computational element that is operable to respond to and processes instructions that drive the system. Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated with a processing device that may be shared by other processing devices. Additionally, the one or more individual processors, processing devices and elements are arranged in various architectures for responding to and processing the instructions that drive the system.

The processor 904 and accompanying components have connectivity to the memory 906 via the bus 902. The memory 906 includes both dynamic memory (e.g., RAM, magnetic disk, writable optical disk, etc.) and static memory (e.g., ROM, CD-ROM, etc.) for storing executable instructions that when executed perform the acts described herein for identification of a landing site for aerial vehicles. In particular, the memory 906 includes the instructions related to the map processing platform 102 (including one or more of the modules 202-212 and/or services platform 108, services 108a, 108b, and content providers 110a, 110b) to perform acts related to identification of a landing site for aerial vehicles. The memory 906 also stores the data associated with or generated by the execution of the acts.

The present disclosure provides system and method to identify potential sites for proper landing and take-off of aerial vehicles (VTOLs, delivery drones, etc.) with minimal manual effort. The present system and method may help with initial feasibility checks with low cost 3-channel satellite images such as those on Google Maps. If an area is suitable for UAV or VTOL landing, further feasibility checks are carried out using drone images and video. Herein, the neighborhood is surveyed to identify the potential landing site in consideration of factors such as transport connectivity, electrical supply, obstacles, emergency landing sites. This provides comprehensive information to decide if a landing site may be constructed. The present system and method utilize deep learning models to infer useful metrics of landing station infrastructure from aerial images. Polygon regression models are implemented to identify buildings from aerial images to obtain accurate geometry. This way the present disclosure may also be used to infer urban sprawl, scope for expansion of buildings, land encroachments, etc. It may be appreciated that the proposed method is scalable to large regions with minimal human effort.

The system and method of the present disclosure may be implemented for creating a network of landing pads/bays based on aerial imagery, ground data and artificial intelligence. Further, the present system and method may be implemented to evolve this network automatically based on new constructions/improvement to existing infrastructure. The proposed solution is designed to significantly reduce the effort required to solve the problem of identifying infrastructural sites for aerial vehicles and delivery drones. The key problems solved are detection of potential sites to land and take-off aerial vehicles, determining feasibility of these sites in terms of road connectivity and traffic conditions, detection of potential sites for construction of battery recharging infrastructure, and reducing the human effort significantly by automating the process.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope.

The invention claimed is:

1. A computer-implemented method for identification of a landing site for aerial vehicles, the method comprising:

processing image data pertaining to a potential site area;

identifying existing building infrastructure and defining boundaries of the identified existing building infrastructure in the potential site area, based on the processed image data;

identifying existing road infrastructure adjacent to the boundaries of the identified existing building infrastructure and defining boundaries of the identified existing road infrastructure, based on the processed image data;

determining an accessibility index of the identified existing road infrastructure based on a relative distance between the identified existing building infrastructure and the identified existing road infrastructure;

determining a connectedness index of the identified existing road infrastructure based on a distance of the identified existing road infrastructure from one or more of nearby transport stations;

determining a quality index of the identified existing road infrastructure based on a physical condition of the identified existing road infrastructure;

determining a traffic index of the identified existing road infrastructure based on an estimation of average traffic on the identified existing road infrastructure over one or more time periods;

calculating a connectivity score for the identified existing road infrastructure based on the determined accessibility index, the connectedness index, the quality index, and the traffic index thereof;

calculating a feasibility score of the existing building infrastructure based on the calculated connectivity score; and outputting the identified existing building infrastructure as a potential landing site for landing aerial vehicles when the calculated feasibility score of the identified existing building infrastructure is above a predetermined threshold score.

2. The method of claim 1, wherein the feasibility score of the identified existing building infrastructure is a measure of the identified existing building infrastructure as the landing site to support landing of the aerial vehicles thereon.

3. The method of claim 1, further comprising:
determining a height index based on an estimation of a height of the identified existing building infrastructure;
determining an obstacle index based on an identification of one or more possible obstacles proximal to the identified existing building infrastructure and relative positions thereof with respect to the identified existing building infrastructure for landing the aerial vehicles thereon; and
calculating an absence of obstacles score for the identified existing building infrastructure based on the determined height index and the obstacle index.

4. The method of claim 3, wherein the height of the identified existing building infrastructure is estimated by utilizing one or more of information of camera parameters associated with the image data, altitude information associated with the image data, and depth analysis of the identified existing building infrastructure from the image data.

5. The method of claim 3, further comprising:
calculating an electricity availability score for the identified existing building infrastructure based on known uptime of electricity supply to the identified existing building infrastructure.

6. The method of claim 5, further comprising:
calculating an ease of flying score for the identified existing building infrastructure based on at least one of identification of no-fly zones and availability of potential emergency landing sites nearby the identified existing building infrastructure.

7. The method of claim 6, further comprising:
assigning respective weight coefficients to one or more of the calculated connectivity score, the absence of obstacles score, the electricity availability score, and the ease of flying score.

8. The method of claim 7, wherein the feasibility score is calculated as a cumulative sum of the calculated connectivity score, the absence of obstacles score, the electricity availability score, and the ease of flying score in consideration of the assigned one or more respective weight coefficients.

9. The method of claim 1, wherein the existing building infrastructure is outputted as the potential landing site utilizing real-time image data obtained from the aerial vehicle.

10. The method of claim 1, further comprising:
determining a height index based on an estimation of a height of the identified existing building infrastructure;
determining an obstacle index based on an identification of one or more possible obstacles proximal to the identified existing building infrastructure and relative positions thereof with respect to the identified existing building infrastructure for landing the aerial vehicles thereon; and
calculating an absence of obstacles score for the identified existing building infrastructure based on the determined height index and the obstacle index.

11. The method of claim 1, further comprising:
calculating an electricity availability score for the identified existing building infrastructure based on known uptime of electricity supply to the identified existing building infrastructure.

12. The method of claim 1, further comprising:
calculating an ease of flying score for the identified existing building infrastructure based on at least one of identification of no-fly zones and availability of potential emergency landing sites nearby the identified existing building infrastructure.

13. An apparatus for identification of a landing site for aerial vehicles, the apparatus comprising:
one or more processors;
a memory communicatively coupled to the one or more processors, wherein the memory is configured with the one or more processors to:
process image data pertaining to a potential site area;
identify existing building infrastructure and define boundaries of the identified existing building infrastructure in the potential site area, based on the processed image data;
identify existing road infrastructure adjacent to the boundaries of the identified existing building infrastructure and define boundaries of the identified existing road infrastructure, based on the processed image data;
determine an accessibility index of the identified existing road infrastructure based on a relative distance between the identified existing building infrastructure and the identified existing road infrastructure;
determine a connectedness index of the identified existing road infrastructure based on a distance of the identified existing road infrastructure from one or more of nearby transport stations;
determine a quality index of the identified existing road infrastructure based on a physical condition of the identified existing road infrastructure;

determine a traffic index of the identified existing road infrastructure based on an estimation of average traffic on the identified existing road infrastructure over one or more time periods;

calculate a connectivity score for the identified existing road infrastructure based on the determined accessibility index, the connectedness index, the quality index, and the traffic index thereof;

calculate a feasibility score of the existing building infrastructure based on the calculated connectivity score; and output the identified existing building infrastructure as a potential landing site for landing aerial vehicles when the calculated feasibility score of the identified existing building infrastructure is above a predetermined threshold score.

14. The apparatus of claim 13, wherein the feasibility score of the identified existing building infrastructure is a measure of the identified existing building infrastructure as the landing site to support landing of the aerial vehicles thereon.

15. The apparatus of claim 13, wherein the memory is further configured with the one or more processors to:

determine a height index based on an estimation of a height of the identified existing building infrastructure;

determine an obstacle index based on an identification of one or more possible obstacles proximal to the identified existing building infrastructure and relative positions thereof with respect to the identified existing building infrastructure for landing the aerial vehicles thereon; and calculate an absence of obstacles score for the identified existing building infrastructure based on the determined height index and the obstacle index.

16. The apparatus of claim 15, wherein the height of the identified existing building infrastructure is estimated by utilizing one or more of information of camera parameters associated with the image data, altitude information associated with the image data, and depth analysis of the identified existing building infrastructure from the image data.

17. The apparatus of claim 15, wherein the memory is further configured with the one or more processors to:

calculate an electricity availability score for the identified existing building infrastructure based on known uptime of electricity supply to the identified existing building infrastructure.

18. A system comprising:

one or more aerial vehicles; and an apparatus in communication with the one or more aerial vehicles, the apparatus comprising:

one or more processors;

a memory communicatively coupled to the one or more processors, wherein the memory is configured with the one or more processors to:

process image data pertaining to a potential site area;

identify existing building infrastructure and define boundaries of the identified existing building infrastructure in the potential site area, based on the processed image data;

identify existing road infrastructure adjacent to the boundaries of the identified existing building infrastructure and define boundaries of the identified existing road infrastructure, based on the processed image data;

determine an accessibility index of the identified existing road infrastructure based on a relative distance between the identified existing building infrastructure and the identified existing road infrastructure;

determine a connectedness index of the identified existing road infrastructure based on a distance of the identified existing road infrastructure from one or more of nearby transport stations;

determine a quality index of the identified existing road infrastructure based on a physical condition of the identified existing road infrastructure;

determine a traffic index of the identified existing road infrastructure based on an estimation of average traffic on the identified existing road infrastructure over one or more time periods;

calculate a connectivity score for the identified existing road infrastructure based on the determined accessibility index, the connectedness index, the quality index, and the traffic index thereof;

calculate a feasibility score of the existing building infrastructure based on the calculated connectivity score; and output the identified existing building infrastructure as a potential landing site for landing aerial vehicles when the calculated feasibility score of the identified existing building infrastructure is above a predetermined threshold score.

* * * * *